United States Patent
Simon et al.

(10) Patent No.: US 10,899,383 B2
(45) Date of Patent: Jan. 26, 2021

(54) CONTROL UNIT THAT ADJUSTS A TILT ANGLE OF A TILTING VEHICLE

(71) Applicant: FORD GLOBAL TECHNOLOGIES, LLC, Dearborn, MI (US)

(72) Inventors: Marc Simon, Cologne (DE); Lucian Lippok, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 231 days.

(21) Appl. No.: 16/034,034

(22) Filed: Jul. 12, 2018

(65) Prior Publication Data
US 2019/0016381 A1 Jan. 17, 2019

(30) Foreign Application Priority Data
Jul. 17, 2017 (DE) .................. 10 2017 212 165

(51) Int. Cl.
*B62D 9/02* (2006.01)
*B62K 5/10* (2013.01)
*B60W 40/10* (2012.01)
*B60G 17/016* (2006.01)

(52) U.S. Cl.
CPC .......... *B62D 9/02* (2013.01); *B60G 17/0162* (2013.01); *B60W 40/10* (2013.01); *B62K 5/10* (2013.01); *B60G 2300/45* (2013.01); *B60G 2400/104* (2013.01); *B60G 2800/019* (2013.01)

(58) Field of Classification Search
CPC .......... B60G 17/0162; B60G 2800/019; B60G 2300/45; B60G 2400/104; B62K 5/10; B60W 40/10; B60W 30/045; B60W 2720/18; B60W 2520/125; B62D 9/02

USPC ...................................................... 280/5.508
See application file for complete search history.

(56) References Cited

U.S. PATENT DOCUMENTS

| | | | | |
|---|---|---|---|---|
| 6,829,524 | B2* | 12/2004 | Chee ................ | B60G 17/01908 280/5.507 |
| 7,079,928 | B2* | 7/2006 | Lu ...................... | B60G 17/0162 280/735 |
| 8,235,398 | B2 | 8/2012 | Mercier | |
| 2002/0139599 | A1* | 10/2002 | Lu ..................... | B60T 18/17554 180/282 |

(Continued)

FOREIGN PATENT DOCUMENTS

| | | |
|---|---|---|
| CN | 102770333 A | 11/2012 |
| DE | 102004047860 A1 | 4/2006 |
| DE | 102009014747 A1 | 12/2010 |

*Primary Examiner* — Toan C To
(74) *Attorney, Agent, or Firm* — Raymond L. Coppiellie; Brooks Kushman, P.C.

(57) ABSTRACT

The disclosure concerns a tilting vehicle with at least one multi-wheel axle, a vehicle structure and a control unit that is arranged to detect a lateral acceleration acting on the tilting vehicle and actively adjust a tilt angle of the structure of the vehicle about the longitudinal axis thereof. In order to optimize adjustment of the tilt angle in a tilting vehicle, the control unit is arranged to adjust the tilt angle so that in a direction of a lateral axis of the structure of the vehicle, a Y component of the lateral acceleration is partially compensated by a Y component of acceleration due to gravity according to a specified compensation proportion. The compensation proportion increases as a function of the lateral acceleration to a global maximum value at a first acceleration, and decreases above the first acceleration.

17 Claims, 3 Drawing Sheets

(56) References Cited

U.S. PATENT DOCUMENTS

| | | | |
|---|---|---|---|
| 2006/0180372 A1* | 8/2006 | Mercier | B60T 8/1706 180/210 |
| 2008/0012262 A1* | 1/2008 | Carabelli | B62K 5/10 280/124.106 |
| 2008/0197597 A1 | 8/2008 | Moulene et al. | |
| 2010/0044977 A1* | 2/2010 | Hughes | B60G 21/007 280/5.509 |
| 2010/0274445 A1 | 10/2010 | Haynes | |
| 2014/0252730 A1* | 9/2014 | Spahl | B62D 9/02 280/5.5 |
| 2014/0252734 A1* | 9/2014 | Spahl | B62D 61/06 280/5.059 |
| 2014/0312580 A1* | 10/2014 | Gale | B62D 9/02 280/5.509 |
| 2016/0059661 A1* | 3/2016 | Saeger | B60G 17/0162 701/38 |
| 2016/0059923 A1* | 3/2016 | Simon | B61F 5/00 280/62 |
| 2016/0144680 A1* | 5/2016 | Simon | B62D 9/04 280/124.103 |
| 2018/0057050 A1* | 3/2018 | Takenaka | B62D 9/02 |

\* cited by examiner

CONTROL UNIT THAT ADJUSTS A TILT ANGLE OF A TILTING VEHICLE

CROSS-REFERENCE TO RELATED APPLICATIONS

This application claims foreign priority benefits under 35 U.S.C. § 119(a)-(d) to DE Application 10 2017 212 165.3 filed Jul. 17, 2017, which is hereby incorporated by reference in its entirety.

TECHNICAL FIELD

The disclosure concerns a tilting vehicle with a control unit that is configured detect a lateral acceleration and actively adjust a tilt angle of the tilting vehicle.

BACKGROUND

When cornering a rail vehicle, lateral forces that occur cause two problems. For one thing, the lateral forces must be prevented by an adequate frictional force between wheels and a rolling surface that the vehicle is carried out or slides out of the turn. For another thing, it must be ensured that there is no tilting moment that can cause the vehicle to be tipped over. Considering a process in a reference system of the vehicle, a centrifugal force together with a gravitational force forms a resultant force that is directed obliquely downwards. In the case of single-track vehicles such as motorcycles or bicycles, a rider must ensure that they tilt the vehicle by steering or weight transfer, so that a common center of gravity of the driver and the vehicle lies in a direction of a resultant force relative to a wheel contact line. This corresponds to a state in which a Z-axis (vertical axis) of the motorcycle points in the direction of the resultant of the gravitational force and the centrifugal force. In the case of a centrifugal acceleration of 10 m/s$^2$, an angle of approx. 45° relative to the vertical results.

In the case of multi-track vehicles, in particular two-track vehicles on at least one axle with a small track width, a similar stability problem arises. Here too, a tilting moment would result in the vehicle already tipping over in upright travel at relatively low speeds or relatively large turn radii. Therefore, a tilt technology would normally be used with said type of vehicle, which at least parts of a structure of the vehicle are inclined relative to the rolling surface. This is often carried out in the case of two closely adjacent wheels by raising an axle of the wheel on an inside of the turn in a direction of the vertical axis (Z-axis) of the structure of the vehicle and lowering the wheel on an outside of the turn. As a rule, an active tilt technology is used, wherein at least one actuator assists or adjusts an inclination of the structure of the vehicle. Because of the width of the vehicle and the necessary installation space for the suspension and other components, it is difficult with such vehicles to achieve tilt angles in the region of 45°. For a track width of approx. 90 cm, tilt angles in the region of 20 to 35° are usually possible.

In general, tilt technology involves a component of the centrifugal acceleration acting in a direction of a lateral axis (Y-axis) of the structure of the vehicle being completely or partially compensated by a component of acceleration due to gravity that is acting in an opposite direction. In the case of a multi-track vehicle, in this case fundamentally different degrees of compensation are conceivable that have different advantages. If a lower degree of compensation is selected, then torques to be applied by an actuator for adjustment of the inclination could be kept low. Moreover, the vehicle is less sensitive to disturbances that may be caused by the rolling surface or the driver himself, for example. A high degree of compensation results in lower energy consumption by the actuator, because said actuator—after reaching the intended inclination—only has to counteract a small or even no lateral acceleration, and of course this also results in the driver perceiving a lower lateral acceleration.

From US 2008/0197597 A1, a vehicle with tilt technology is known, with which for one thing a chassis, for another thing front wheels can be tilted relative to ground. In this case, it is provided that an inclination is arrested if the vehicle is moving at low speed or stops. Moreover, the inclination can be limited to a maximum angle of for example 25° to prevent the vehicle from tipping over when at a standstill. Furthermore, an embodiment is described with which an ideal tilt angle is determined at which a driver would not feel any lateral acceleration, and an actual tilt angle is adjusted to a specified fraction of the ideal tilt angle.

U.S. Pat. No. 8,235,398 B2 discloses a method for operating a tilting vehicle, wherein a frame is subjected to a tilting moment by an actuator. The tilting moment is determined as a function of a steering moment exerted on a handlebar, a speed of the vehicle and a current tilt angle. In this case, it is provided that a component counteracting a change in the tilt angle is only effective below a first speed limit and the maximum value thereof is reached at low speeds. A component dependent on the steering moment is by contrast only effective above a second speed limit that can lie above the first speed limit, for example.

From US 2010/0274445 A1, a stabilizing arrangement for a two-wheeler is known that comprises two lateral supporting wheels that are deployed automatically below a defined speed. The two supporting wheels are commonly fastened to a suspension that can be rotated about a longitudinal axis of the two-wheeler. In this case, a lateral force acting on the two-wheeler can be detected, and a tilt angle of the two-wheeler can be adjusted by a suitable setting of a suspension so as to correspond to a resultant of a gravitational force and a lateral force.

CN 102770333 A discloses a three-wheel vehicle with tilt technology, in which a sensor unit measures a lateral acceleration on a body of the vehicle. By an actuator, an inclination of the body of the vehicle is adjusted so that lateral acceleration is zero in a reference system of the body of the vehicle.

In view of the indicated prior art, an adjustment of a tilt angle in a tilting vehicle still leaves room for improvements.

SUMMARY

It is an object of the disclosure to optimize adjustment of a tilt angle in a tilting vehicle.

It should be noted that the features and measures individually mentioned in the following description can be combined with each other in any technically meaningful manner and reveal further embodiments of the disclosure. The description additionally characterizes and specifies the disclosure, in particular in connection with the figures.

The disclosure provides a tilting vehicle with at least one multi-wheel axle and a vehicle structure. As the tilting vehicle, in this connection a vehicle with wheels is referred to in which an inclination of a structure of the vehicle relative to a rolling surface can be varied without one of the wheels being lifted off the rolling surface. This refers in particular to three or four-wheel vehicles, in which two wheels on at least one axle are disposed adjacent to each other. As a rule, the vehicle is a tilting rail vehicle. An application of the disclosure to vehicles that are at least partly operated by muscle power is conceivable, but the tilting vehicle is usually a motor vehicle. This can for example be driven electrically or by a combustion engine.

At least one axle of the tilting vehicle is embodied in a multi-wheel form, i.e. it comprises a plurality of (usually two) adjacent wheels. Said axle can be an actively steered, passively steered or unsteered axle. It can be a front axle, a rear axle or (if there are at least three axles) a central axle. The axle, or each further axle, of the tilting vehicle can comprise one or more adjacent wheels. In particular, said axle can comprise two wheels that can be individually, vertically (in a direction of a vertical axis, or Z-axis, of the structure of the vehicle) deflected relative to the structure of the vehicle. Deflection of respective wheels can be coupled to a—possibly marginal—deflection in a non-vertical direction (i.e. in a direction of an X-axis and/or Y-axis). "Individually deflectable" means here that in an event of a deflection of one of the wheels, a different deflection of each other wheel is possible. The deflections do not have to be completely, mutually independent here, but there can be a certain coupling between them, for example to an effect that an upward deflection of one wheel assists a downward deflection of another wheel. This can for example be carried out by a stabilizer, or balance arm, that is coupled on an outside to suspensions of the two wheels, and in a center to the structure of the vehicle. Besides such a configuration, in which the wheels can be deflected vertically, independently, designs are also conceivable in which for example—as with rail vehicles with tilt technology—a chassis remains stationary relative to the rolling surface, and the structure is tilted relative to the chassis.

The tilting vehicle furthermore comprises a control unit that is arranged to detect lateral acceleration acting on the tilting vehicle, and actively adjust a tilt angle of the structure of the vehicle about a longitudinal axis thereof. In this case, lateral acceleration refers to an acceleration that is acting in a transverse direction relative to a current direction of travel of the tilting vehicle. Normally, said lateral acceleration is a result of cornering. The control unit detects said lateral acceleration either by measurements thereof or by measurement values that are transmitted thereto by an external unit. To recognize and quantitatively detect the lateral acceleration, the acceleration does not have to be measured directly. Thus, for example, a currently acting lateral acceleration can be determined at least approximately from a current speed of travel and a current steering angle. In a broader sense, such embodiments are also included in which a value of the currently acting lateral acceleration is not explicitly, quantitatively detected. For example, it would be conceivable that only one component of the lateral acceleration is measured, from which in principle the lateral acceleration could be calculated together with additional parameters.

The tilt angle of the structure of the vehicle is actively adjustable, usually by at least one actuator. In this case, we can say that the control unit adjusts the tilt angle via the at least one actuator. Such an actuator can act directly, or indirectly, on the wheels of the multi-wheel axis or on the suspension thereof, for example in order to influence the vertical deflection thereof, which is directly related to the inclination of the structure of the vehicle. The actuator can operate electrically, hydraulically or pneumatically. The tilt angle concerns a rotation or inclination about the longitudinal axis (X-axis) of the structure of the vehicle. This includes embodiments in which the inclination of the structure of the vehicle is not exactly about the longitudinal axis, but for example also partly about the vertical axis. This would for example be a tilting vehicle, in which a tilt axis is inclined relative to the longitudinal axis by a certain angle in a direction of the vertical axis. In this case, the at least one actuator effectively exerts a torque on the structure of the vehicle that causes and/or stabilizes the tilt angle thereof. In this case, an adjustment of the tilt angle can be carried out in the form of control or regulation, i.e. the control unit can for example obtain feedback via a sensor regarding whether an intended tilt angle has been achieved. The term "control unit" is not to be construed to mean that all components of the control have to be disposed at one point on the tilting vehicle. Rather, the control unit can also consist of a plurality of distributively disposed components. Parts or individual functions of the control unit can also be implemented in software.

According to the disclosure, the control unit is arranged to adjust the tilt angle so that in a direction of a lateral axis of the structure of the vehicle, a Y component of the lateral acceleration is partially compensated by a Y component of acceleration due to gravity, according to a specified compensation proportion. Depending on a determined lateral acceleration, the control unit adjusts the tilt angle (by suitably actuating the at least one actuator) such that a Y component of the lateral acceleration acting in the direction of the lateral axis (Y-axis) of the vehicle is partially compensated by a Y component of the acceleration due to gravity acting in the direction of the lateral axis. If the lateral acceleration is denoted by a, the acceleration due to gravity by g and the tilt angle by $\varphi$, then the following applies for the Y components $a_y$ and $g_y$:

$$a_y = a \cos \varphi$$

$$g_y = g \sin \varphi$$

In this case, it will be understood that respective relevant Y components of the acceleration due to gravity and the lateral acceleration in the direction of the lateral axis act in opposition to each other, because otherwise no compensation would be possible. The partial compensation is carried out in this case according to a compensation proportion K. I.e., a Y component of the acceleration due to gravity does not correspond (in general) to a Y component of the lateral acceleration, but only to a proportion thereof that is expressed by the compensation proportion K. The compensation proportion can be specified as a dimensionless variable, for example as a number between 0 and 1 or as a percentage between 0% and 100%. Generally, it is defined in this connection as a ratio or quotient of the Y components:

$$K = \frac{g_y}{a_y} = \frac{g}{a}\tan\varphi$$

As discussed below, a respective value of the compensation proportion—which in general can be freely selected—is a function of one or more parameters, wherein however at least for some values of said parameters the compensation proportion is less than 100%, so that only a partial compensation is carried out. The compensation proportion is at least implicitly specified for this, either by the control unit itself or for example by a memory that the control unit accesses. An implicit specification of the compensation proportion could for example consist of specifying the tilt angle $\varphi$ as a function of the lateral acceleration a.

According to the disclosure, the compensation proportion increases as a function of the lateral acceleration to a global maximum value at a first acceleration and then decreases.

The compensation proportion is thus a function of the lateral acceleration, i.e. it can be represented as a (non-constant) function of the lateral acceleration. The control unit thus adjusts the angle depending on the value of the lateral acceleration according to a different compensation proportion. The compensation proportion adopts a global maximum value at a first acceleration. The term "first acceleration" is only used for terminological distinction and does not imply any order or numeric value of a corresponding acceleration. As a global maximum value, a value is referred to here that is not exceeded in the case of any other lateral acceleration. I.e., it is the largest value of the compensation proportion occurring as a function of the lateral acceleration. Said value is preferably also only adopted at one point, but it would be conceivable that for example a "plateau" is formed, so that the compensation proportion is constant over a certain interval as a function of the lateral acceleration. Overall, the compensation proportion increases (with increasing lateral acceleration) to the maximum value and then decreases (possibly after traversing a plateau).

It should be noted that despite a rise and fall of the compensation proportion, an adjusted tilt angle usually increases monotonically as a function of the lateral acceleration. In particular however, an increase in the tilt angle is limited by a decrease in the compensation proportion at higher lateral accelerations, whereby for example it can be avoided that a technically possible maximum angle is already reached at relatively low lateral accelerations. Such behavior could result in a driver not feeling any significant acceleration in the Y direction until reaching the corresponding lateral acceleration (because this is entirely or predominantly compensated), but this suddenly increases as it were after exceeding the corresponding lateral acceleration, which could be irritating for the driver. By contrast, a reduction in the compensation proportion according to the disclosure results in the driver of the tilting vehicle feeling a relatively, slowly increasing uncompensated proportion of the Y component of the lateral acceleration. This can be advantageous insofar as in this way the driver notices that the vehicle is approaching a limit of stability. He thus gets an early opportunity either to reduce speed or increase a turn radius. In addition, reaching a maximum angle early would result in no further changes in inclination arising at higher lateral accelerations, which could also be irritating for the driver. This problem is also avoided according to the disclosure.

Said function profile above the first acceleration can also be considered to be a kind of compromise between safety and economy. On the one hand, high values of the lateral acceleration also automatically mean that the respective Y component of the lateral acceleration adopts a relatively large value and thus a relatively large uncompensated proportion remains with only partial compensation. Of course, this may not increase arbitrarily, because this could result in the tilting vehicle tipping over. However, in order to not allow a torque to be applied by at least one actuator to increase too much, a restriction of the compensation proportion is purposeful.

That the compensation proportion is increasing towards the global maximum value means implicitly that there is a smaller compensation proportion at lower lateral accelerations. This is advantageous insofar as for example compensation is only of secondary importance at low lateral accelerations, whereas compensation is more important at higher accelerations for aspects of both comfort and safety. It is also, actually sometimes better if only low-level compensation is carried out at low lateral accelerations, which often accompany low speeds, so that the vehicle only tilts slightly.

It is preferable that the compensation proportion for the first acceleration is less than 100%, preferably less than 90%, more preferably less than 80%, particularly preferably less than 70%. Because the global maximum value exists for the first acceleration, the compensation proportion is of course also below said value for all other lateral accelerations. By limiting the compensation proportion, for example, a necessary torque for adjustment of the tilt angle can be limited. On the other hand, such a limitation is in general harmless from a safety viewpoint.

The compensation proportion is preferably a continuous function of the lateral acceleration. I.e., the compensation proportion does not change suddenly as a function of the lateral acceleration. In particular, this results in pleasant driving behavior for the driver, because in this way it is excluded that the tilt angle changes suddenly and sharply during a slow change in the lateral acceleration. It will be understood that the term "continuous" is not used in a strict mathematical sense, but in a sense that the function can still be considered to be continuous even if slight steps (for example of 1% or less) occur that are usually not perceptible by the driver.

The first acceleration can lie between 3 $m/s^2$ and 6 $m/s^2$, preferably between 4 $m/s^2$ and 5.5 $m/s^2$. I.e. an increase in the compensation proportion is carried out over a relatively large region before the maximum value is reached.

It would be conceivable that the compensation proportion passes through one or more local maxima below the first acceleration, before it finally reaches the global maximum value. However, the compensation proportion preferably increases monotonically up to the first acceleration. In particular, it can increase strictly monotonically, so that no plateaus occur. The increase in the compensation proportion can decrease as a function of the lateral acceleration according to a convex profile. A monotonic increase up to the maximum value is in general purposeful and sufficient, so that at low lateral acceleration the vehicle behaves rather stiffly as it were, i.e. remains relatively upright, whereas with increasing lateral acceleration the compensation proportion, and hence the inclination, increase in order to guarantee safety and ride comfort. Adoption of local maximum values is in general disadvantageous, because this can result in behavior of the tilting vehicle that is non-intuitive for the driver.

In this case, the compensation proportion can adopt different values at zero (i.e. slightly greater than 0 $m/s^2$, for example 0.1 $m/s^2$, lateral acceleration), which of course must lie below the global maximum value by definition. A low value at zero is preferable. This can for example be no greater than 40%, preferably no greater than 20%, more preferably no greater than 10%. At the same time, it can be purposeful to apply a lower limit to the compensation proportion at zero, so that said compensation proportion can be at least 5%, at least 10% or at least 20%.

Even above the first acceleration, the compensation proportion could again adopt one or more local maximum values, which is in general not advantageous however—as for below the first acceleration. Accordingly, the compensation proportion decreases preferably monotonically above the first acceleration. In particular, the compensation proportion can decrease strictly, monotonically.

For both the safety and comfort aspects, it is however purposeful that the compensation proportion does not decrease too rapidly, or too much. Therefore, according to a preferred embodiment, the compensation proportion lies above an intermediate value of at least 30%, preferably at least 40%, more preferably at least 50% from the first acceleration to at least twice the first acceleration. Based on the aforementioned preferred values for the first acceleration, twice said value in general already represents a value that is only reached during more extreme driving maneuvers. It can also be said that at higher lateral accelerations, but lateral accelerations that are still usual in everyday life, compensation proportion values do not fall below said intermediate value.

The compensation proportion preferably increases monotonically up to the intermediate value for up to a second acceleration that is lower than the first acceleration. Starting from zero (i.e. 0 m/s² lateral acceleration), the compensation proportion increases monotonically as a function of the lateral acceleration until it reaches the intermediate value at the second acceleration. This means that in a reverse order there is a compensation proportion below the intermediate value below the second acceleration. As already mentioned, at low lateral accelerations in general a relatively low compensation proportion is sufficient, without this having a disadvantageous effect on the stability of the vehicle. In fact, at such low lateral accelerations, which for example occur in connection with steering movements at low speed, an inclination of the vehicle is sometimes perceived as unpleasant or irritating. In this respect, it is often beneficial to ride quality if the compensation proportion is kept low in the described way and thus no tilting movements, or only small tilting movements, are carried out.

In this case, the second acceleration can preferably lie between 1 m/s² and 2.5 m/s², more preferably between 1.5 m/s² and 2 m/s². Insofar as these are relatively moderate accelerations, the compensation proportion increases relatively strongly as a function of the lateral acceleration between zero and the second acceleration.

Further advantageous details and effects of the disclosure are described in detail below using an exemplary embodiment that is represented in the Figures. In the Figures:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different Figures, identical parts are always given the same reference characters, for which reason they are also only described once as a rule.

Figure 1:
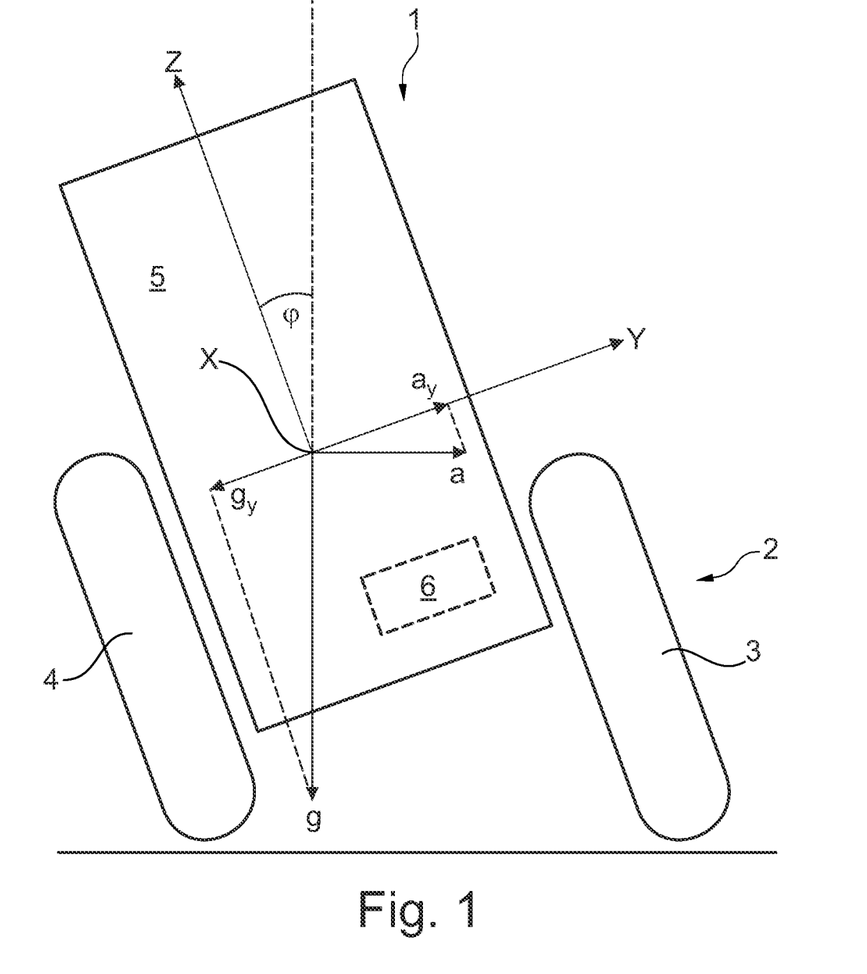
FIG. 1 shows a rear view of a tilting vehicle according to the disclosure when cornering.

FIG. 1 shows a rear view of a tilting vehicle 1 according to the present disclosure while cornering. The tilting vehicle 1 comprises an axle 2 (which can be a steered or unsteered front or rear axle) with two wheels 3, 4 lying adjacent to each other that are movably disposed on a structure 5 of the vehicle. The structure of the vehicle 5 can inter alia also support a driver and a further payload.

With cornering represented in FIG. 1, a left turn is being traversed. The tilting vehicle 1 comprises tilt technology, according to which the wheels 3, 4 can be individually deflected along a vertical axis (Z-axis) of the structure 5 of the vehicle. During this, a wheel 3 on an outside of a turn is deflected downwards, and a wheel 4 on an inside of the turn is deflected upwards. As a result, an inclination of the structure 5 of the vehicle about a longitudinal axis (X-axis) thereof is possible. The object of the inclination is to reduce any tilting moment at least to an extent as to prevent one of the wheels 3, 4 losing contact with a rolling surface. The inclination is influenced by at least one actuator that is not represented here, which for example can act on a suspension of the wheels 3, 4.

The adjustment of a tilt angle φ is carried out in this case by a control unit 6, which is represented here only schematically, and can consist of one or more components, which can also be partly configured by software. The control unit 6 acts on the at least one actuator, or the actuator can even be considered to be part of the control unit 6. The control unit 6 is however arranged to determine a lateral acceleration acting on the tilting vehicle 1. This can be carried out either directly via a suitable acceleration sensor, or, for example indirectly by measuring a speed of the vehicle and determining a turn radius via a steering angle of the steered wheels. As can be seen in FIG. 1, two accelerations are acting on a center of gravity of the tilting vehicle 1, namely a lateral acceleration a and an acceleration due to gravity g. Generally, said two accelerations can be broken down into components and in doing so Y components $a_y$ and $g_y$ acting in a direction of a Y-axis can be identified. The tilt angle is denoted by φ, thus the following applies for the Y components:

$$a_y = a \cos \varphi$$

$$g_y = g \sin \varphi$$

At the indicated inclination of the tilting vehicle 1, said two Y components are of course in opposite directions, so that they compensate each other wholly or partially. As a measure of this, a compensation proportion K can be defined as follows:

$$K = \frac{g_y}{a_y} = \frac{g}{a}\tan\varphi$$

Figure 2:
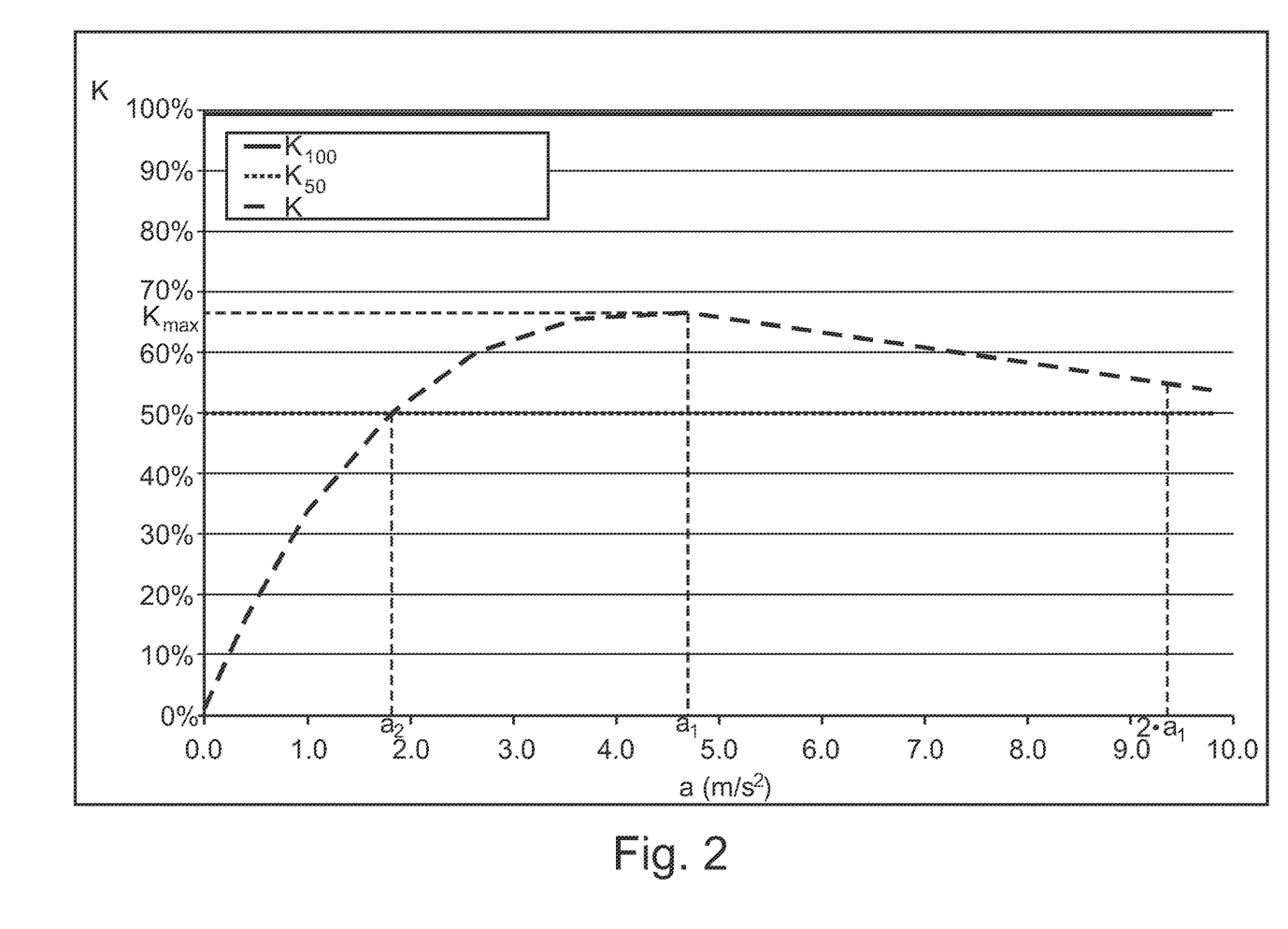
FIG. 2 shows a graphical representation of compensation proportions as a function of lateral acceleration.

In the present case, the control unit 6 is arranged to adjust the tilt angle φ as a function of the lateral acceleration, so that the compensation proportion K as represented in FIG. 2 varies as a function of the lateral acceleration a. The compensation proportion K starts with a value of 0% at a lateral acceleration of 0 m/s² and increases strictly, monotonically until the compensation portion reaches a global maximum value of $K_{max}$, which in this case is approx. 67%, at a first acceleration $a_1$ of approx. 4.7 m/s². I.e., for small lateral accelerations, no compensation or only a little compensation is carried out, whereby the tilt angle φ also remains very small. In other words, the tilting vehicle 1 behaves relatively stiffly in said region and tends to remain upright, which for example at low speeds prevents frequent inclination changes that may be unpleasant for the driver. Alternatively to the profile shown here, the compensation proportion could adopt a greater value at 0 m/s², for example 20% or 40%, and could increase from the greater value up to the global maximum value $K_{max}$.

Figure 3:
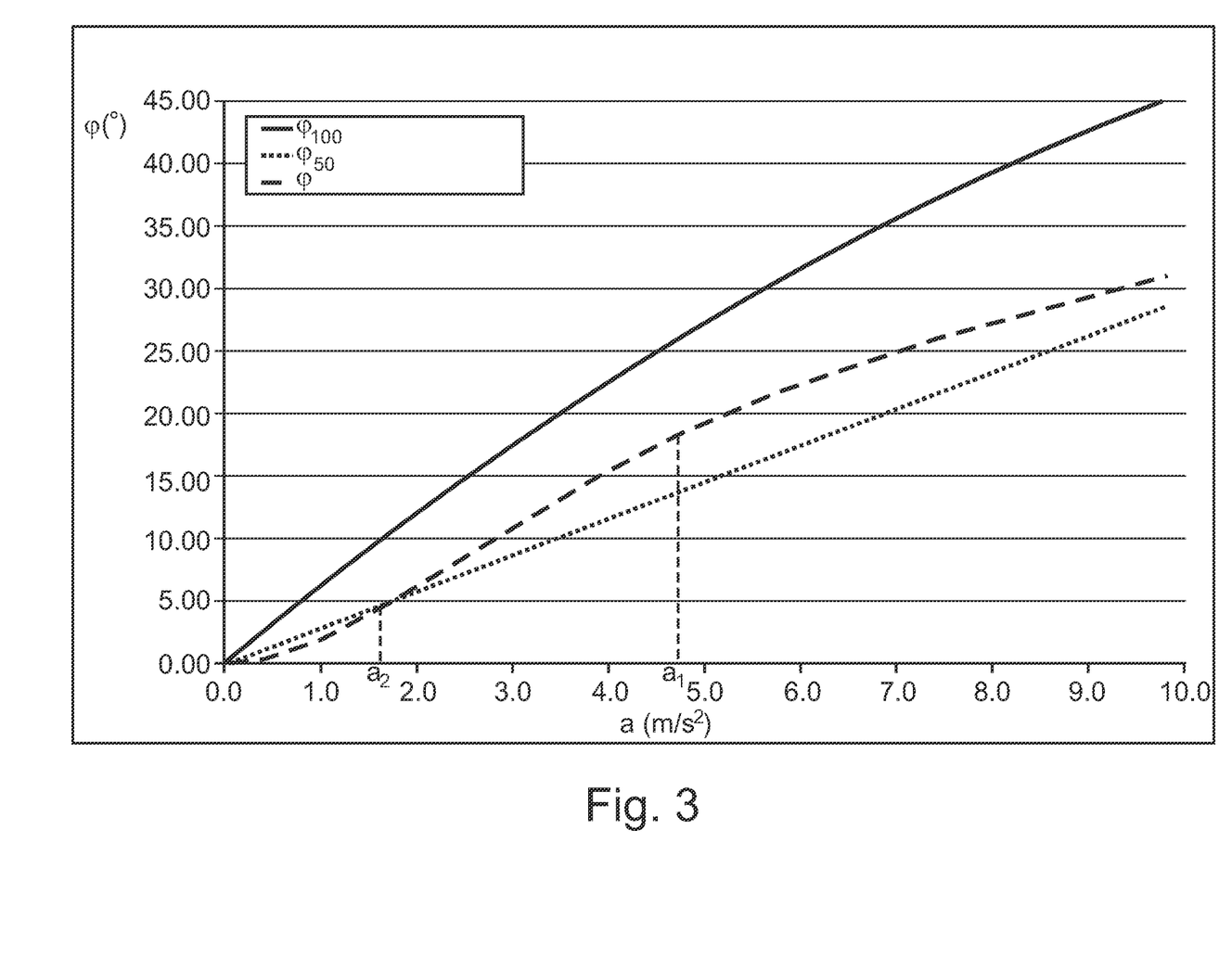
FIG. 3 shows a graphical representation of inclination angles as a function of lateral acceleration.

It is to be noted that the profile of the graph is convex, so that an initial steep increase to the global maximum value $K_{max}$ decreases more and more. I.e., the compensation proportion K already increases significantly for relatively moderate lateral accelerations. Thus for example, at a second acceleration $a_2$ of approx. 1.8 m/s² the compensation portion reaches an intermediate value $K_m$ of 50%. Thus, a proportion of the lateral acceleration that is perceptible by the driver is significantly reduced here. An associated tilt angle is however still relatively small (approx.) 5°, as can be seen from FIG. 3, which illustrates the profile of the tilt angle φ as a function of the lateral acceleration a. The compensation proportion $K_{100}$ (corresponding to 100%) and the compensation proportion $K_{50}$ (corresponding to the intermediate value of 50%) are plotted in FIG. 2 for comparison with the compensation proportion K according to the disclosure. Likewise, the profile of the tilt angle $φ_{100}$ (corresponding to a compensation proportion of 100%) and $φ_{50}$ (corresponding to a compensation proportion of 50%) are plotted in FIG. 3.

Above the first acceleration $a_1$, the compensation proportion decreases strictly monotonically. During this, however, the compensation portion remains above an intermediate value of 50% up to twice the first acceleration (and beyond). The profile of the graph in this region can at least partly also be slightly convex. As can be seen from FIG. 3, the tilt angle continues to increase, for which reason the Y component $g_y$ of the acceleration due to gravity also continues increasing. The decrease in the compensation proportion is caused by a relatively greater increase in the Y component $a_y$ of the lateral acceleration. It can also be seen in FIG. 3 that in a region of 9 to 10 m/s² (which is seldom exceeded in everyday use) a tilt angle in the region of 30° is just reached, which is still mechanically possible for typical tilting vehicles 1. In comparison thereto, a corresponding tilt angle for a compensation proportion of 100% is already reached at approx. 6 m/s². In this case, the driver would thus experience full compensation up to said value of the lateral acceleration, whereas thereafter an actually, achievable compensation proportion would decrease relatively, rapidly owing to a mechanically defined limit. This could cause the driver to incorrectly estimate limits of driving safety. In contrast, the compensation proportion K is already decreasing after passing through the first acceleration $a_1$, which is a physically perceptible indication for the driver that he is approaching the limit of stability.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A tilting vehicle, comprising:
   at least one multi-wheel axle arranged on a vehicle structure; and
   a control unit that is arranged to detect a lateral acceleration acting on the tilting vehicle and actively adjust a tilt angle of the structure about a longitudinal axis of the structure such that, in a direction of a lateral axis of the structure, a Y-component of the lateral acceleration is partially compensated by a Y-component of gravity corresponding to a specified compensation proportion that increases monotonically as a function of the lateral acceleration to a global maximum value at a first acceleration and decreases above the first acceleration.

2. The tilting vehicle as claimed in claim 1, wherein the specified compensation proportion at the first acceleration is less than 70%.

3. The tilting vehicle as claimed in claim 1, wherein the specified compensation proportion is a continuous function of the lateral acceleration.

4. The tilting vehicle as claimed in claim 1, wherein the first acceleration lies between 3 m/s² and 6 m/s².

5. The tilting vehicle as claimed in claim 1, wherein the specified compensation proportion at zero acceleration is no greater than 10%.

6. The tilting vehicle as claimed in claim 1, wherein the specified compensation proportion decreases monotonically above the first acceleration.

7. The tilting vehicle as claimed in claim 1, wherein, from the first acceleration at least up to twice the first acceleration, the specified compensation proportion lies above an intermediate value that has a value of at least 50%.

8. The tilting vehicle as claimed in claim 7, wherein the specified compensation proportion increases monotonically to the intermediate value up to a second acceleration that is lower than the first acceleration.

9. The tilting vehicle as claimed in claim 8, wherein the second acceleration lies between 1 m/s² and 2.5 m/s².

10. A vehicle tilt technology system comprising:
    a multi-wheel axle arranged across a longitudinal axis of a vehicle structure; and
    a control unit configured to actively adjust a structure tilt angle such that, in a direction of a lateral axis of the structure, a lateral acceleration Y-component is partially compensated by a gravity Y-component at a specified compensation proportion that monotonically increases with the lateral acceleration to a maximum at, and decreases below, a first acceleration.

11. The vehicle tilt technology system as claimed in claim 10, wherein the specified compensation proportion decreases monotonically above the first acceleration.

12. The vehicle tilt technology system as claimed in claim 10, wherein, from the first acceleration at least up to twice the first acceleration, the specified compensation proportion lies above an intermediate value that has a value of at least 40%.

13. The vehicle tilt technology system as claimed in claim 12, wherein the specified compensation proportion increases monotonically to the intermediate value up to a second acceleration that is lower than the first acceleration.

14. An apparatus for vehicle tilt technology comprising:
    a control unit that is arranged to, in response to a lateral acceleration acting on a tilting vehicle, actively adjust a tilt angle of a structure about a longitudinal axis such that, in a direction of a lateral axis of the structure, a Y-component of the lateral acceleration is partially compensated by a Y-component of gravity corresponding to a specified compensation proportion that monotonically increases as a function of the lateral acceleration to a global maximum value at a first acceleration and decreases above the first acceleration.

15. The apparatus for vehicle tilt technology as claimed in claim 14, wherein the specified compensation proportion decreases monotonically above the first acceleration.

16. The apparatus for vehicle tilt technology as claimed in claim 14, wherein, from the first acceleration at least up to twice the first acceleration, the specified compensation proportion lies above an intermediate value that has a value of at least 30%.

17. The apparatus for vehicle tilt technology as claimed in claim 16, wherein the specified compensation proportion increases monotonically to the intermediate value up to a second acceleration that is lower than the first acceleration.

* * * * *